(12) United States Patent
Henry et al.

(10) Patent No.: US 6,653,829 B1
(45) Date of Patent: Nov. 25, 2003

(54) LOW COST APPROACH TO MEASURING HIGH RESOLUTION ROTARY POSITION OF ELECTRIC MACHINES

(75) Inventors: Rassem Ragheb Henry, Clinton Township, MI (US); Sayeed A. Mir, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 224 days.

(21) Appl. No.: 09/661,944

(22) Filed: Sep. 14, 2000

Related U.S. Application Data

(60) Provisional application No. 60/154,687, filed on Sep. 17, 1999.

(51) Int. Cl.[7] .............................. G01B 7/14; G01P 3/00
(52) U.S. Cl. ............................... 324/207.21; 702/147
(58) Field of Search ..................... 324/207.21, 166, 324/167, 207.25; 702/142, 145, 147, 148; 180/443

(56) References Cited

U.S. PATENT DOCUMENTS

| | | | |
|---|---|---|---|
| 3,924,721 A | 12/1975 | Reynolds | 197/18 |
| 4,122,478 A | 10/1978 | Gallo et al. | |
| 4,536,809 A | 8/1985 | Sidman | 360/77 |
| 4,599,561 A | 7/1986 | Takahashi et al. | |
| 4,678,973 A | 7/1987 | Elliott et al. | |
| 4,694,229 A | 9/1987 | Cormack | 318/561 |
| 4,715,009 A * | 12/1987 | Bohmler et al. | 702/147 |
| 4,777,435 A * | 10/1988 | Lepley et al. | 324/166 |
| 4,794,536 A | 12/1988 | Eto et al. | |
| 4,843,923 A | 6/1989 | Futami | 318/609 |
| 4,874,053 A * | 10/1989 | Kimura et al. | 324/207.21 |
| 4,916,641 A | 4/1990 | Bybee | 364/550 |
| 5,021,941 A | 6/1991 | Ford et al. | 364/176 |
| 5,062,064 A * | 10/1991 | Sagues et al. | 702/147 |
| 5,065,324 A | 11/1991 | Oshita et al. | |
| 5,077,507 A | 12/1991 | Mitani et al. | 318/569 |
| 5,144,564 A | 9/1992 | Naidu et al. | 364/494 |
| 5,177,417 A | 1/1993 | Lee et al. | 318/254 |
| 5,203,420 A | 4/1993 | Shiraishi | |
| 5,283,741 A | 2/1994 | Desrus | |
| 5,343,393 A * | 8/1994 | Hirano et al. | 701/41 |
| 5,397,972 A | 3/1995 | Maiocchi | |
| 5,521,475 A | 5/1996 | Fu et al. | |
| 5,650,779 A * | 7/1997 | Sugden | 341/9 |
| 5,729,102 A * | 3/1998 | Gotou et al. | 318/254 |
| 5,739,969 A | 4/1998 | Garza | |
| 5,791,432 A | 8/1998 | Fushimi et al. | |
| 5,819,202 A | 10/1998 | Sato et al. | 702/33 |
| 5,892,339 A | 4/1999 | Park et al. | 318/254 |
| 5,898,301 A | 4/1999 | La Croix et al. | |
| 6,014,348 A | 1/2000 | Kim | 363/13 |
| 6,079,513 A | 6/2000 | Nishizaki et al. | |
| 6,128,153 A | 10/2000 | Hasegawa et al. | 360/77.08 |
| 6,289,294 B1 * | 9/2001 | Rataj et al. | 702/145 |
| 6,329,782 B1 | 12/2001 | Chen et al. | 318/727 |

* cited by examiner

*Primary Examiner*—John Barlow
*Assistant Examiner*—Toan M Le
(74) *Attorney, Agent, or Firm*—Michael D. Smith

(57) ABSTRACT

A method for measuring a rotary position of an electric machine includes read a pulse counter that counts a sequence of pulses. The sequence of pulses is related to the rotary position. A determination as to whether a new pulse has been detected is performed. And a computation of a new angle that is related to the rotary position. A speed measuring circuit that includes an input having a set of position signals and an output having a set of speed signals may include the method for measuring a rotary position of an electric machine.

19 Claims, 11 Drawing Sheets

LOW COST APPROACH TO MEASURING HIGH RESOLUTION ROTARY POSITION OF ELECTRIC MACHINES

CROSS-REFERENCE TO RELATED APPLICATIONS

This application is based upon, and claims the benefit of, U.S. Provisional Patent Application No. 60/154/687, filed Sep. 17, 1999, the disclosures of which are incorporated by reference in their entirety.

TECHNICAL FIELD

This invention relates to measuring of rotary positions and more particularly, to a low cost approach to measuring high resolution rotary position of a sinusoidally controlled motor.

BACKGROUND OF THE INVENTION

It is known in the art relating to electric motors that polyphase permanent magnet (PM) brushless motors with a sinusoidal field offer the capability of providing low torque ripple, noise and vibration compared to motors with a trapezoidal field. Theoretically, if a motor controller can produce polyphase sinusoidal currents with the same frequency as that of the sinusoidal back EMFs, the torque output of the motor will be a constant, and zero torque ripple can be achieved. However, due to practical limitations of motor design and controller implementation, there are always deviations from those assumptions of pure sinusoidal back EMF and current waveforms. The deviations will usually result in parasitic torque ripple components at various frequencies and magnitudes. The methods of torque control can influence the level of this parasitic torque ripple.

One method for torque control of a permanent magnet motor with a sinusoidal back EMF is accomplished by controlling the motor phase currents so that its current vector is aligned with the back EMF. This control method is known as the current mode control method. In such a method, the motor torque is proportional to the magnitude of the current. However, the current mode control method has some drawbacks. The current mode control method requires a complex controller for digital implementation. The controller requires two or more A/D channels to digitize the current feedback from current sensors. In a three phase system, it is convenient to transform the three-phase variables into a two dimensional d-q synchronous frame which is attached to the rotor and design the controller in the d-q frame. But, due to considerable calculations and signal processing involved in performing the d-q transformation, reverse d-q transformation and P-I loop algorithms, a high speed processor such as a digital signal processor (DSP) has to be used to update the controller information every data sampling cycle.

Electric power steering (EPS) has been the subject of development by auto manufacturers and suppliers for over a decade because of its fuel economy and ease-of-control advantages compared with the traditional hydraulic power steering (HPS). However, commercialization of EPS systems has been slow and is presently limited to small and midget-class cars due to cost and performance challenges. Among the most challenging technical issues is the pulsating feel at the steering wheel and the audible noise associated with the type of high performance electric drives needed to meet the steering requirements.

The choice of motor type for an EPS is important, because it determines the characteristics of the drive and the requirements on the power switching devices, controls, and consequently cost. Leading contenders are the Permanent Magnet (PM) brushless motor, the Permanent Magnet (PM) commutator-type motor and the switched reluctance (SR) motor, each of the three options has its own inherent advantages and limitations. The PM brushless motor, was chosen based on years of experimenting with commutator-type motors. The large motor size and rotor inertia of commutator-type motors limit their applicability to very small cars with reduced steering assist requirements. Additionally, the potential for brush breakage that may result in a rotor lock necessitates the use of a clutch to disconnect the motor from the drive shaft in case of brush failure. SR drives offer an attractive, robust and low cost option, but suffer from inherent excessive torque pulsation and audible noise, unless special measures are taken to reduce such effects. For EPS column assist applications, the motor is located within the passenger compartment and therefore must meet stringent packaging and audible noise requirements that the present SR motor technology may not satisfy. Therefore, the PM brushless motor with its superior characteristics of low inertia, high efficiency and torque density, compared to commutator motors, appears to have the potential for not only meeting the present requirements but also of future high performance EPS systems of medium and large vehicles.

Despite the relatively low levels of torque ripple and noise of EPS systems using conventional PM brushless motors, they are no match to the smoothness and quietness of HPS with decades-long history of performance refinement efforts. Consumers are reluctant in compromising such features. Therefore, a new torque ripple free (TRF) system is needed, which as the name indicates would eradicate the sources of torque ripple (under ideal conditions) and reduces the noise level considerably. The near term goal is to enhance the performance of EPS systems with the long term objective of increasing acceptability of EPS systems for broader usage.

Several performance and cost issues have stood in the way of broad-based EPS commercialization regardless of the technology used, but with varying degree of difficulty. This requires that following be addressed:

1. Steering Feel: The key to the wider use of EPS is the ability to reproduce the smoothness feel of hydraulic steering systems at affordable prices. Pulsating torque produced by motors would be felt at the steering wheel, if not reduced to very low levels.

2. Audible Noise: The EPS audible noise is mainly emanating from the motor and gearbox. The gear noise is obviously mechanical due to lash caused by manufacturing tolerances. The motor-caused noise is mainly a result of structural vibration excited by torque pulsation and radial magnetic forces in brushless motors and by the commutator/brush assembly in commutator motors.

In order to better appreciate the elements of the new scheme, a more detailed discussion about the torque ripple and noise generation mechanisms with a focus on PM brushless motors is presented in the following sections.

TORQUE RIPPLE CAUSES AND REMEDIES

There are two sources for torque ripple in a conventional PM brushless motors: 1. cogging or detent torque, and 2. commutation torque.

The cogging torque is due to the magnetic interaction between the permanent magnets and the slotted structure of the armature. It exists in both brushless and brush-type machines at all speeds and loads, including no-load. The magnetic attraction force exerted on each individual stator tooth, as the magnet leading edge approaches, produces a positive torque, while the force between the tooth and the trailing edge causes a negative torque. The instantaneous value of the cogging torque varies with rotor position and alternates at a frequency that is proportional to the motor speed and the number of slots. The amplitude of the cogging torque is affected by some design parameters, such as slot opening/slot pitch ratio; magnet strength; and air gap length, while its profile could be altered by varying the pole arc/pole pitch ratio. Careful selection of these parameters can lead to reducing cogging torque, but this approach is limited by practical and performance constraints.

A more common and effective approach is by skewing either the stator teeth or the rotor magnet longitudinally, which provides for a gradual transition as the magnet moves under a stator tooth. Theoretically, a skew amount of one slot pitch should eliminate cogging. However, due to practical factors such as magnetic leakage end effects, skew variation due to tolerances, and eccentricity, some undesirable cogging remains.

In a voltage controlled system, such as a torque ripple free motor with sinusoidal inverter and voltage mode operation, a reduction of torque ripple typically can be achieved by way of utilizing a high resolution sensor. However, the high resolution sensor has drawbacks such as high cost, high maintenance, high error rate, etc. Therefore it is desirable to have a low cost, low maintenance, low error rate, and so forth approach to measuring with acceptable resolution for rotary positions of an electric machine.

SUMMARY OF THE INVENTION

One solution to the above mentioned problems is by using a low resolution position sensor in a method to estimate a position of the motor rotor in between sensed position signals. For example, the method can be as simple as using a speed, be it estimated or measured, to estimate the position during the time interval from a previously sensed known position until the next position value is sensed or known. Then, position values are acquired by integration of sensed speed values. Because integration is a very robust and stable operation, one can take the integral of the speed and use the previous measured position as an initial condition. With the initial condition set, it is sufficient to have a good estimate of the position until a next position signal is sensed.

This disclosure teaches a method and apparatus for measuring a rotary position of an electric machine that includes reading a pulse counter that counts a sequence of pulses. The sequence of pulses is related to the rotary position. A determination is then made as to whether a new pulse has been detected and a computation of a new angle that is related to the rotary position is generated. A speed measuring circuit that includes an input having a set of position signals and an output having a set of speed signals may be included in the method for measuring a rotary position of an electric machine.

It is noted that a low resolution position sensor introduces undesirable "step-ladder" noise into what should be a smoothly sinusoidal position signal. Poor position resolution distorts the sinusoidal build up function for the command voltage along with the command amplitude. This invention eliminates these problems while using a low cost, low-resolution position sensor.

DESCRIPTION OF THE PREFERRED EMBODIMENT

Figure 2:
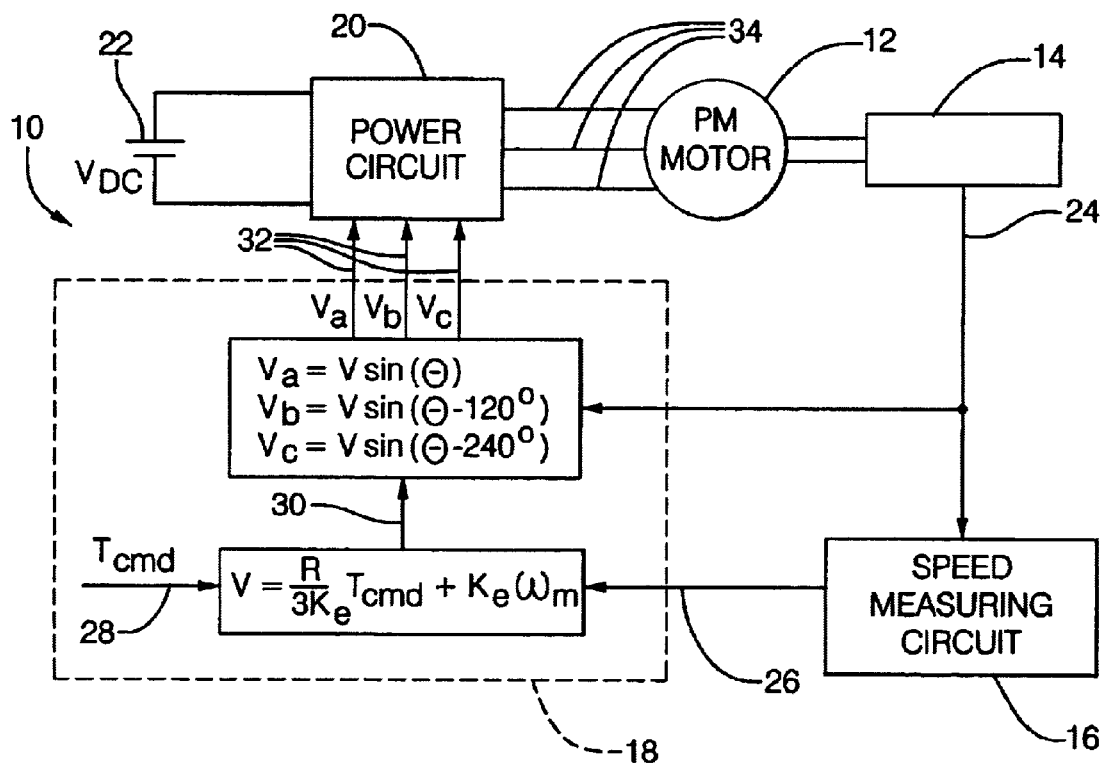
FIG. 2 is a block diagram of a system for controlling the torque of a sinusoidally excited permanent magnet motor.

Referring now to the drawings in detail, numeral 10 generally indicates a system for controlling the torque of a sinusoidally excited permanent magnet motor 12. The system includes a rotor position encoder 14, speed measuring circuit 16, controller 18, power circuit 20 and power source 22 as shown in FIG. 2.

Figure 1:
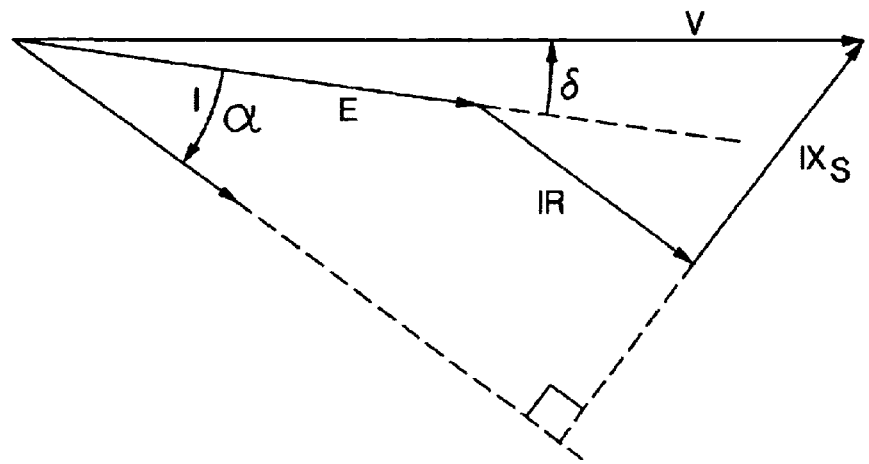
FIG. 1 is a phasor diagram of a permanent magnet motor under constant voltage excitation.

The torque of the motor is controlled without using any current sensors. By eliminating the use of the current sensors, the low frequency torque ripple is reduced so that the output torque is smoother. Instead of controlling the torque producing current, the controller determines the voltage required for producing the desired torque based on motor equations. The voltage mode control method is based on machine operation phasor diagram as shown in FIG. 1. Under steady state operating condition, the voltage phasor $\vec{V}$, back EMF phasor $\vec{E}$ and current phasor $\vec{I}$ of a sinusoidally excited PM motor are governed by:

$$\vec{V} = \vec{E} + \vec{I}R + j\vec{I}X_s \qquad (1)$$

where R is the winding resistance, $X_s$ is the phase reactance that is equal to the product of motor inductance $L_s$ and the excitation frequency ω. Here, it is assumed that the angle between back EMF phasor $\vec{E}$ and current phasor $\vec{I}$ is α and the angle between the voltage phasor $\vec{V}$ and the back EMF phasor $\vec{E}$ is δ.

Neglecting motor iron losses, friction and windage losses, the output power of the PM motor is equal to $$P = 3IE \cos \alpha \qquad (2)$$

and the output torque is $$T = P/\omega_m \quad (3)$$

where $\omega_m = \omega/(\text{no. of pole pairs})$. Based on the phasor diagram, it can be derived that $$V \cos \delta = E + IR \cos \alpha + IX_s \sin \alpha \quad (4)$$

$$V \sin \delta = -IR \sin \alpha + IX_s \cos \alpha \quad (5)$$

Solving equations 4 and 5 yields $$\cos \alpha = \frac{(V \cos \delta - E)R + X_s V \sin \delta}{I(R^2 + X_s^2)} \quad (6)$$

By substituting equation 6 into equation 2, it is obtained that $$P = 3E \frac{(V \cos \delta - E)R + X_s V \sin \delta}{R^2 + X_s^2} \quad (7)$$

From equation 7 and equation 3, the motor torque can be expressed $$T = 3K_e \frac{(V \cos \delta - K_e \omega_m)R + X_s V \sin \delta}{R^2 + X_s^2} \quad (8)$$

where $K_e = E/\omega_m$ is the EMF constant. It can be seen from equation 8 that the motor torque is dependent on the motor input voltage V, the motor parameters and operating speed. Hence, given the motor parameters and speed, by controlling the voltage magnitude V and its phase angle $\delta$ relative to back EMF E, it is possible to control the motor torque to a desired value. Equation 8 forms the basis of the control method.

Because it is difficult to deal with the control of two variables at the same time, the angle $\delta$ between the back EMF E and the voltage V vectors is fixed to a value and then the amplitude of the motor input voltage is adjusted. Thus, the voltage required for any given torque command $T_{cmd}$ can be calculated by substituting $T_{cmd}$ into equation 8 and solving for V:

$$V = \frac{1}{R \cos \delta + X_s \sin \delta} \left( \frac{R^2 + X_s^2}{3K_e} T_{cmd} + ER \right) \quad (9)$$

Equation 9 shows that, for a fixed angle $\delta$ between the back EMF and the terminal voltage, to maintain a torque equal to the commanded torque with varying speed, the amplitude of motor input voltage has to change. Thus, information of motor parameters, rotor speed and position angle is required, but no current feedback is needed for the controller to develop a signal to produce a desired motor torque.

In the voltage mode control, the angle $\delta$ has to be chosen properly. By referring to FIG. 1, it can be seen that the phase angle $\alpha$ between the current and the back EMF depends on the angle $\delta$. For different phase angles $\alpha$, the motor armature current can induce a magnetic flux either opposed to or aligned with the magnet field. Therefore, the choice of $\delta$ that results in minimal saturation or demagnetization effects on the permanent magnet field is preferred.

In a preferred embodiment, the voltage mode control method is implemented for a permanent magnet motor with slotless windings having a sinusoidal air gap flux distribution. This type of motor has a large effective air gap and thus, armature currents produce a flux that is negligible compared to the permanent magnet field. As a result, saturation or demagnetization of the permanent field is unlikely to occur in normal operation and a fixed value $\delta$ can be used. Thus, for slotless winding machines, the voltage mode control is particularly suitable. For this particular motor, the motor parameters are listed below:

Motor Type PM, Sinusoidal, 3 phase
Pole Number $N_p = 4$
Input Voltage $V_{dc} = 12$ V
Effective Phase Resistance R=55 m$\Omega$
Inductance $L_s = 38.5$ $\mu$H
Maximum No Load Speed 2800 RPM
Maximum Reactance 22.5 m$\Omega$
EMF Constant $K_e = 0.023$ V/(rad/s)
Encoder Resolution 2.5 degree (electrical)

Based on the motor parameters, the winding reactance of the motor at the maximum speed is relatively small in comparison with its effective winding resistance. This means that, for any given voltage, the angle $\delta$ between the voltage and back EMF phasors is very small and so is the angle $\alpha$ between V and E and the current. Therefore, a suitable choice of the angle $\delta$ between V and E is a constant zero. Based on this condition, the control equation can be reduced to $$V = \left( \frac{R^2 + (\omega_e L_s)^2}{3K_e R} \right) T_{cmd} + K_e \omega_m \quad (10)$$

To implement into hardware, some further simplification is made. Because the motor reactance is much smaller than the resistance, the initial implementation can ignore the inductance term in equation 10. Therefore, only the following simplified control equation is implemented by the controller:

$$V = \frac{R}{3K_e} T_{cmd} + K_e \omega_m \quad (11)$$

In the preferred embodiment, the power circuit is a power inverter, which is coupled between a power source and the controller to supply the phase voltages across the motor windings. The inverter is controlled by space vector pulse width modulated signals generated by the controller. Taking the gain of the inverter into account using a space vector pulse width modulation scheme, the normalized voltage amplitude is given by: $V_{ref} = V/(V_{dc}/\sqrt{6})$. By substituting $V_{ref}$ for V in equation 11, the following simplified control equation is implemented by the controller:

$$V_{ref} = K_1 T_{cmd} + K_2 \omega_m \quad (12)$$

where $K_1 = (\sqrt{6}R)/(3K_e V_{dc})$ and $K_2 = (\sqrt{6}K_e)/V_{dc}$.

The maximum and minimum values of $V_{ref}$ are clamped to $V_{max}$ and $V_{min}$. Thus, for a given PM motor and fixed battery voltage, $K_1$ and $K_2$ are constant and can be stored in the controller memory allowing the control equation to be implemented without using current sensors.

Figure 3:
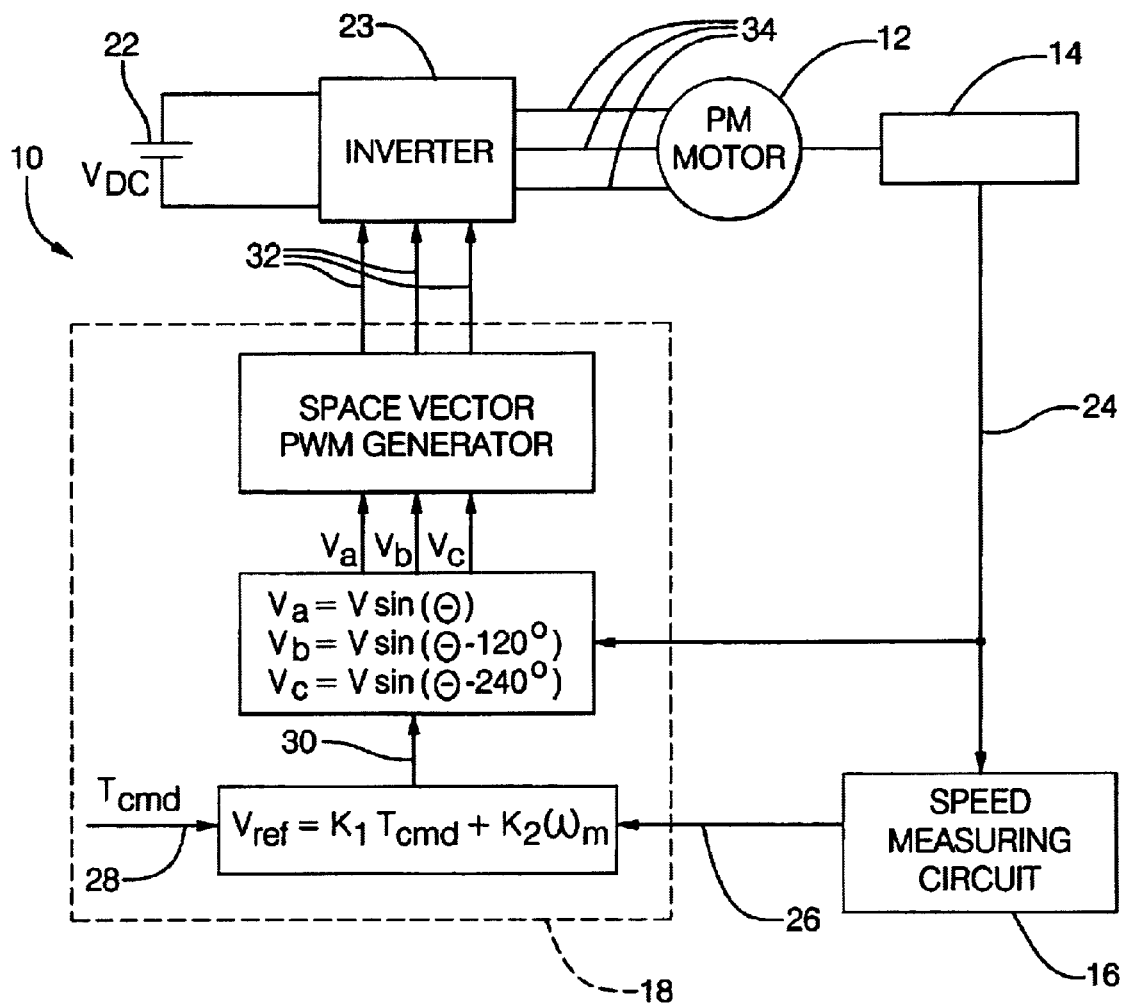
FIG. 3 is a block diagram of a system for controlling the torque of a sinusoidally excited permanent magnet motor.

Referring to FIG. 3, for the controller 18 to develop the correct voltage needed to produce the desired torque, the position and speed of the rotor is needed. A rotor position encoder 14 is connected to the motor to detect the angular position of the rotor. The encoder 14 may sense the rotary position based on optical detection or magnetic field variations. The encoder 14 outputs a position signal 24 indicating the angular position of the rotor.

From the position signal 24, a speed measuring circuit 16 determines the speed of the rotor and outputs a speed signal 26. The circuit 16 may include a counter that counts the position signal pulses for a predetermined duration. The count value is proportional to the speed of the motor. For example, if a counter counts the position signal pulses in time intervals of 5 ms and the encoder has a resolution of 2.5 degree, the speed measurement will have a resolution of about 41.7 rpm. The speed signal can also be obtained as the derivative of the position signal from the equation $\omega_m = \Delta\theta_m/\Delta t$ where $\Delta t$ is the sampling time and $\Delta\theta_m$ is the change in position during the sampling interval.

The position and speed signals 24, 26 and a torque command signal 28 are applied to the controller 18. The torque command signal 28 is indicative of the desired motor torque. The controller 18 determines a voltage amplitude 30 required to develop the desired torque by using the position, speed and torque command signals 24, 26, 28 and other fixed motor parameter values in the control equation 12. For a three-phase motor, three sinusoidal reference signals that are synchronized with the motor back EMF are required to generate the required motor input voltages. The controller transforms the voltage amplitude signal 30 into three phases by determining phase voltage command signals $V_a$, $V_b$ and $V_c$ from the voltage amplitude signal 30 and the position signal 24 according to the following equations:

$$V_a = V_{ref} \sin(\theta) \qquad (13)$$

$$V_b = V_{ref} \sin(\theta - 120°) \qquad (14)$$

$$V_c = V_{ref} \sin(\theta - 240°) \qquad (15)$$

Motor voltage command signals 32 of the controller 18 are applied to a power inverter 23 which is coupled with a power source 22 to apply phase voltages 34 to the stator windings of the motor in response to the motor voltage command signals 32. But in order to generate phase voltages 34 with an average sinusoidal shape, switching devices (not shown) of the inverter 23 must be turned on and off for specific durations at specific rotor angular positions. Control of the inverter 23 can be implemented according to any appropriate pulse width modulation (PWM) scheme. However, because space vector modulation (SVM) as the advantages of higher output voltage, low harmonic distortion, low witching power losses and easy microprocessor implementation, SVM-based control is preferred. In the preferred embodiment, the duty cycle of each phase voltage command signal is given by:

$$D_a = 0.5(1 + sV_a) \qquad (16)$$

$$D_b = 0.5(1 + sV_b) \qquad (17)$$

$$D_c = 0.5(1 + sV_c) \qquad (18)$$

and the space vector voltages $sV_a$, $sV_b$, $sV_c$ are obtained from the following logic equations.

IF $((V_b \geq V_a)$ & $(V_a \geq V_c))$ or $((V_c \geq V_a)$ & $(V_a \geq V_b))$ then $$sV_a = \sqrt{3} V_a$$

$$sV_b = (1/\sqrt{3})(V_b - V_c)$$

$$sV_c = -sV_b \qquad (19)$$

IF $((V_a \geq V_b)$ & $(V_b \geq V_c))$ or $((V_c \geq V_b)$ & $(V_b \geq V_a))$ then $$sV_a = (1/\sqrt{3})(V_a - V_c)$$

$$sV_b = \sqrt{3} V_b$$

$$sV_c = -sV_b \qquad (20)$$

IF $((V_a \geq V_c)$ & $(V_c \geq V_b))$ or $((V_b \geq V_c)$ & $(V_c \geq V_a))$ then $$sV_a = (1/\sqrt{3})(V_a - V_b)$$

$$sV_b = -sV_a$$

$$sV_c = \sqrt{3} V_c \qquad (21)$$

This modulation scheme provides a rms fundamental line to line voltage of 0.7071 $V_{dc}$, which is 15.5% higher than that of a simple sine modulation scheme.

Figure 4:
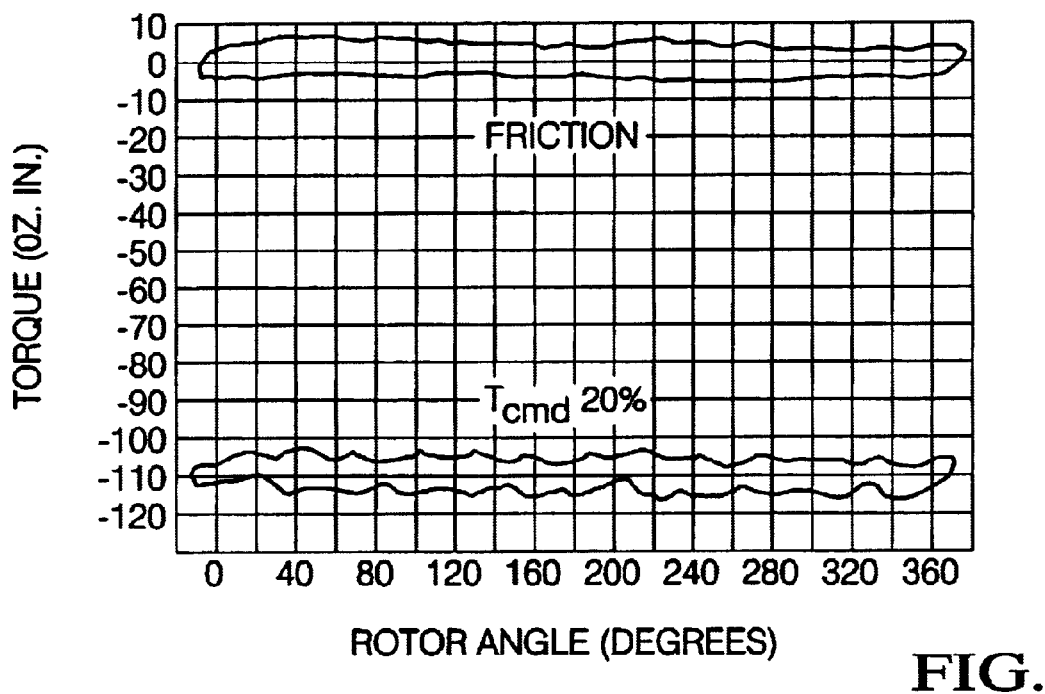
FIG. 4 is a graph of torque vs. rotor angle for a motor controlled by a voltage mode control method at 20% torque command.
Figure 5:
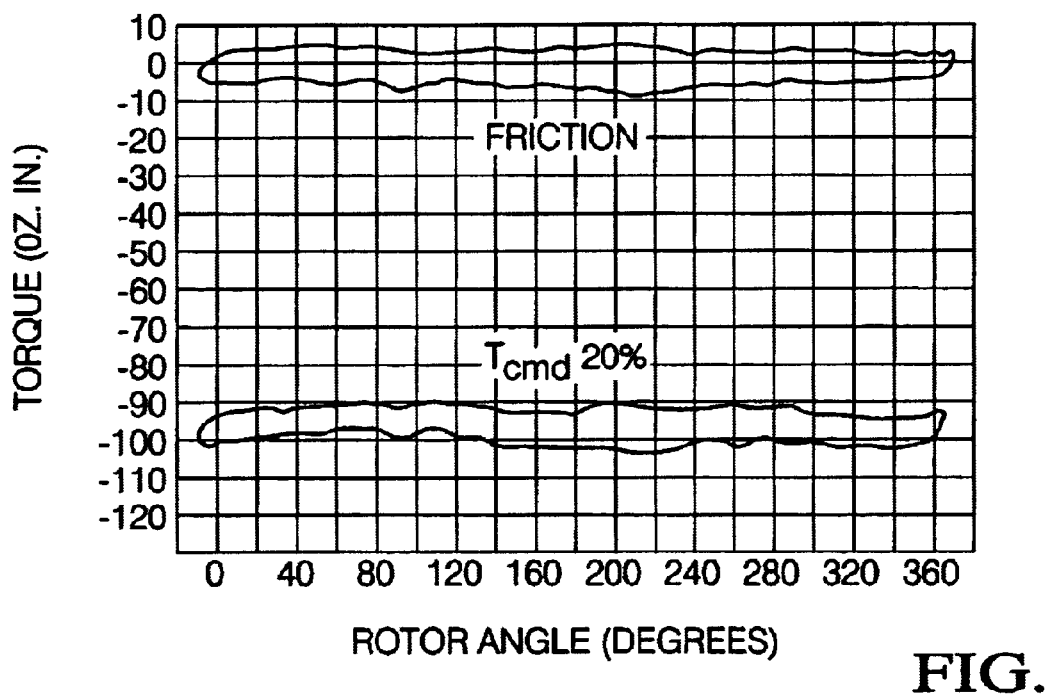
FIG. 5 is a graph of torque vs. rotor angle for a motor controlled by a current mode control method at 20% torque command.

By using this voltage mode control method, the low frequency torque ripple is reduced. FIG. 4 shows the results of a test performed to measure the torque ripple performance of the voltage control method of the present invention. The test was performed on a rotor of a PM motor that was locked and the rotor angle was varied slowly. Thus, the test can be considered to be conducted at zero speed. FIG. 4 shows that there is still some torque ripple in the voltage mode. But the characteristic of torque ripple is different from that of the current mode that is shown in FIG. 5. Unlike the current mode, the frequency of the torque ripple is at the motor commutation frequency that is six times the fundamental frequency. Also, there are no fundamental or 2nd harmonic components seen in FIG. 4. The fact that the torque ripple frequency is six times higher than the current mode allows the voltage mode control method to provide a smoother torque as the higher frequency component is easily filtered out by the system inertia.

The voltage mode control method is not expected to provide the same precise torque control as the current mode. This is because the voltage mode control is a feed-forward control, instead of a closed-loop regulation, and changes in the motor parameters can directly influence the output level. Therefore, it should be applied to only those applications where precise torque level control is not critical.

Figure 6:
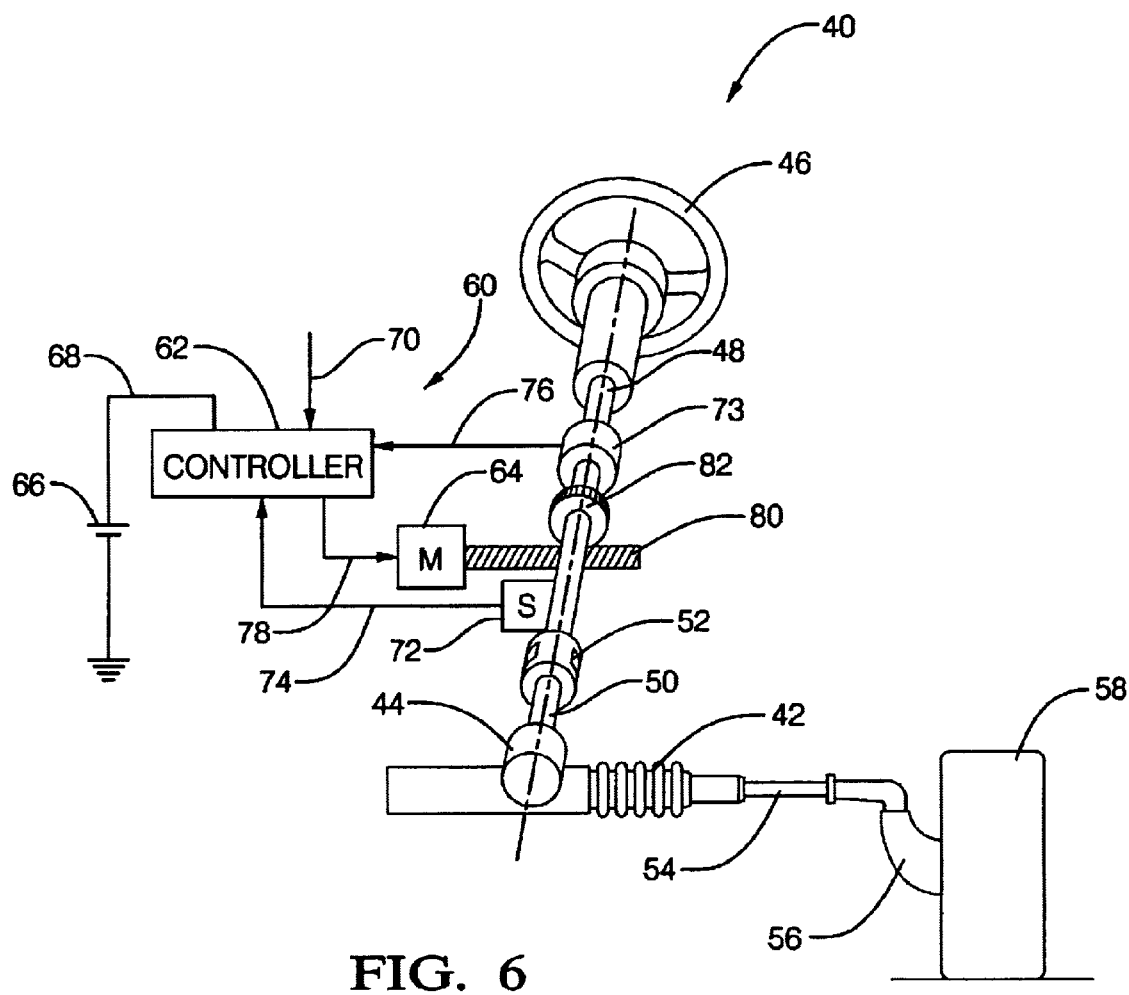
FIG. 6 illustrates a schematic diagram of a column-assist electric power steering system.

One such application is in an electrical power steering system. Referring now to FIG. 6, reference numeral 40 generally designates a motor vehicle power steering system suitable for implementation of this invention. The steering mechanism 42 is a rack-and-pinion type system and includes a toothed rack (not shown) and a pinion gear (also not shown) located under gear housing 44. As the steering wheel 46 is turned, the upper steering shaft 48, connected to the lower steering shaft 50 through universal joint 52, turns the pinion gear. Rotation of the pinion gear moves the toothed rack, which moves tie rods 54 (only one shown), that in turn move the steering knuckles 56 (only one shown), which turn wheels 58 (only one shown).

Electric power steering assist is provided through the unit generally designated by reference numeral 60 and includes a controller 62 and the electric motor 64. The controller 62 is powered by a vehicle power supply 66 through line 68. The controller 62 receives a signal representative of the vehicle velocity on line 70. Steering pinion gear angle is measured through position sensor 72, which may be an optical encoding type sensor, variable resistance type sensor or any other suitable type of position sensor, and fed to the controller 62 through line 74.

As the steering wheel 46 is turned, torque sensor 73 senses the torque applied to the steering wheel 46 by the vehicle operator. The torque sensor 73 may include a torsion bar (not shown) and a variable resistive-type sensor (also not shown) which outputs a variable resistance signal to controller 62 through line 76 in relation to the amount of twist on the torsion bards.

In response to the inputs on lines 70, 74, and 76, the controller 62 sends a current command or a voltage command through line 78 to the electric motor 64. The motor 64 in turn supplies torque assist to the steering system through a worm 80 and a worm gear 82, in such a way as to providing a torque assist to the vehicle steering in addition to a driving force exerted by the vehicle operator.

Figure 7:
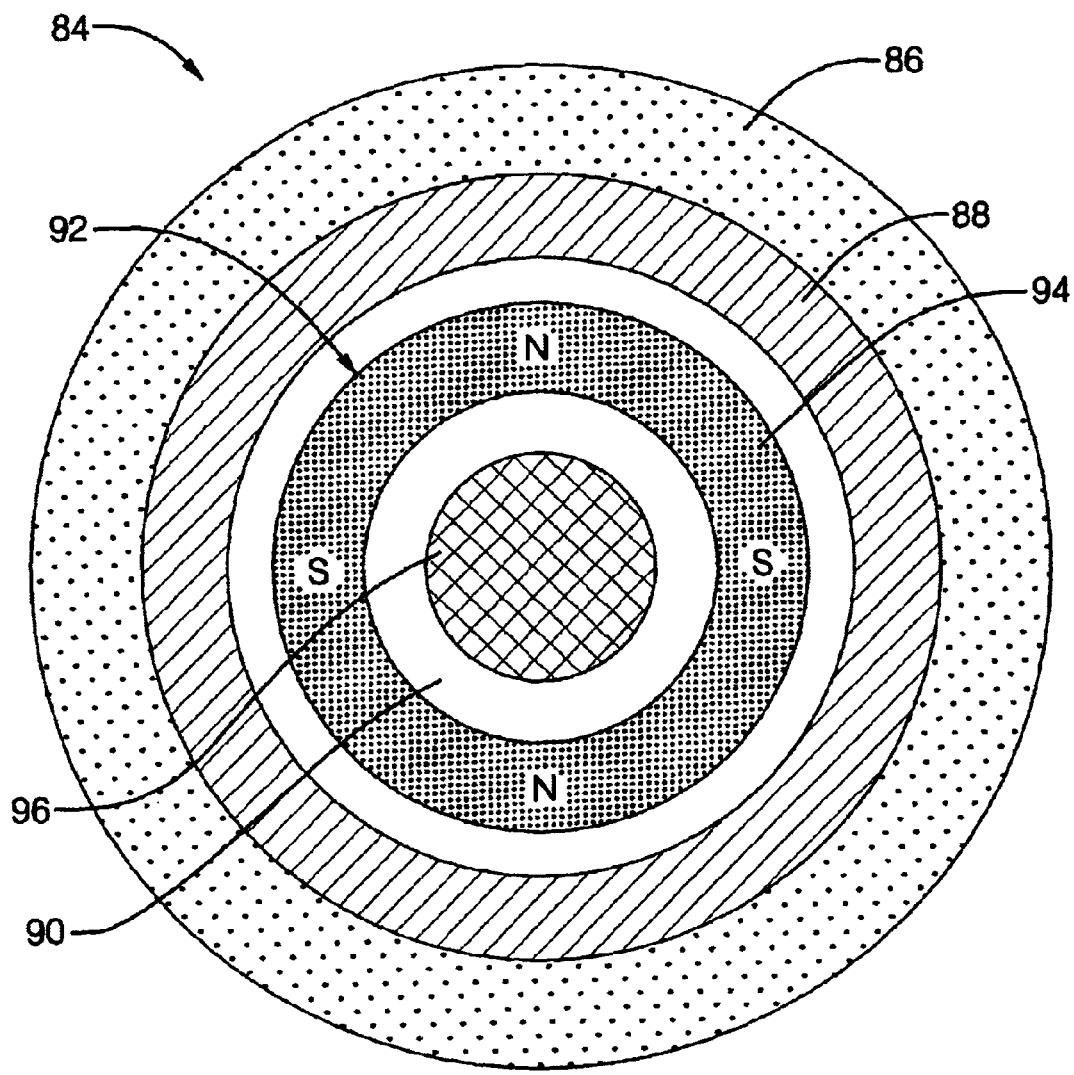
FIG. 7 illustrates a schematic of an embodiment of a TRF motor cross section.

One type of sinusoidal TRF motor may contain several new elements and materials that have not been combined together in one motor in the past. FIG. 7 illustrates a cross section of the sinusoidal TRF motor that is generally designated by the numeral 84. The sinusoidal TRF motor 84 includes a new stator 86 with (a) an air gap (slotless) winding 88, (b) a composite iron yoke 90, also acting as a housing; (c) a new rotor 92 with a high energy magnet 94 and sinusoidal magnetization of the magnet, and (d) a molded composite plastic shaft 96. A new high resolution position sensor (not shown) with magnetic resistor (MR) sensing elements and Steel wheels (also not shown). Such a motor is described in great detail in commonly assigned U.S. Pat. No. 6,498,451, issued Dec. 24, 2002 filed Sep. 6, 2000 under application Ser. No. 09/656,116, and entitled TORQUE RIPPLE FREE ELECTRIC POWER STEERING, the disclosures of which are incorporated by reference herein in their entirety.

In order to generate motor currents with a sinusoidal shape, the inverter switching devices (e.g. MOSFETS) must be turned on and off at specific rotor angular positions. Therefore, the position of the rotor 92 must be known at all times and an encoder is needed. This requirement is one of the factors adding to the cost of sinusoidal drives, hence traditionally limiting their application to high-performance applications. EPS is a high-performance drive, however it must meet stringent cost limits. Therefore, a new type of encoder is desirable such that it combines high resolution and low cost.

The two most popular ways to sense rotary position are based on optical detection and magnetic field variation. Optical encoders are temperature limited and susceptible to dirt. Semiconductor based magnetic sensors (magnetoresistors, or MRs), on the other hand, can work at higher temperature, and are starting to be used in automotive applications.

Figure 8:
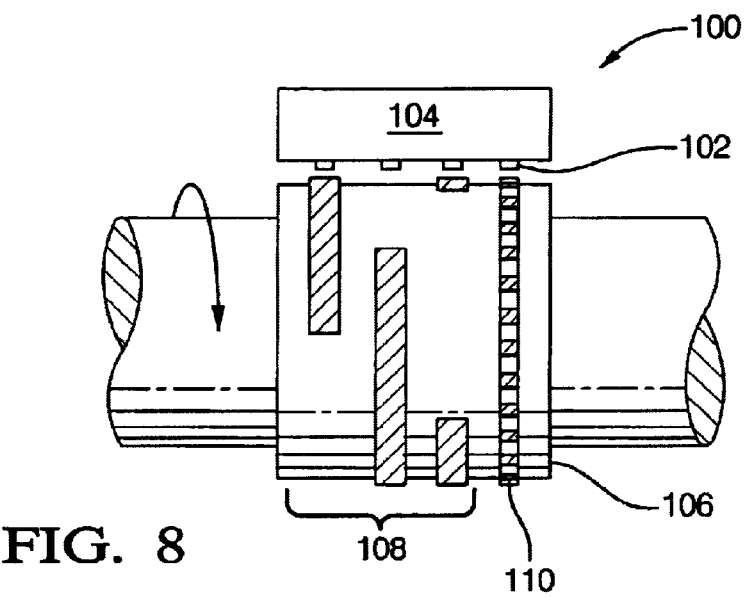
FIG. 8 depicts a four-in-one sensor system for this disclosure.

The basic idea as shown in FIG. 8 includes a four-in-one sensor system 100 using a set of magnetoresistors 102 (MR) mounted on a stationary permanent magnet 104. The stationary permanent magnet 104 faces a steel wheel 106 with several tracks, 108 and 110, each of which has teeth and slots on its periphery, as shown. The teeth and slots modulate the magnet's field and variations in magnetic field. The variations in magnetic field are sensed by the magnetoresistors 102. The several tracks 108 and 110 on the steel wheel 106 allow a sensing mechanism, using the set of magnetoresistors 102 to perform several functions at the same time. A high resolution track 110 provides an incremental signal to enable the generation of sinusoidal currents in the motor. The three other tracks 108 provide absolute signals every 60 electrical degrees. These absolute signals are used for motor commutation, i.e. to direct the current to the appropriate phases, which is particularly important at start up.

An encoder for a TRF device needs to have the highest resolution possible while keeping the sensor simple enough for low cost. The more teeth on the wheel periphery, the higher the resolution. There is, however, a practical limit to increasing the number of teeth. This limit is caused by the fact that the magnet cannot be located much closer than 1.5 mm away from the target wheel, in order to allow for the MR thickness and protective layers on both the magnet and the MR surface, and to provide some clearance between the sensor and the target. If the features on the wheel periphery are much smaller than the gap between the magnet and the wheel, the magnetic field modulation is insignificant and the signal generated is too small to be useful. The sensor resolution is therefore proportional to the sensor wheel diameter. In this particular application, a single MR would provide only 4 mechanical degree resolution, which is considered insufficient. Therefore, several MRs are used to generate additional signals and increase resolution to a satisfactory level.

The difficulty in designing a sensor with multiple MRs resides in the fact that the MR signals must all be of similar magnitudes. A MR signal is, typically, an oscillating signal with a dc bias. In order to obtain the final square-wave signal output, the dc bias must be eliminated. The resulting signal zero crossings are then used to trigger a flip-flop and generate a square wave. The dc bias, however, is difficult to predict as it varies with air gap, wheel concentricity, temperature, doping of the MR material, etc. The MR signals are, therefore, best compared with one another as this provides automatic, internal compensation for many of these variations. For such a comparison to be possible, the sensor must be designed to ensure maximum uniformity among the various MRs. A configuration with an array of several MRs facing the same track is chosen. An exemplary number is four. With this approach the MR chips are located close to one another, therefore ensuring air gap and magnetic field uniformity. In addition, the various MRs come from essentially the same location on the semiconductor wafer from which they originate, thus minimizing MR material variations. The comparison between the various MRs and the elimination of the dc bias is achieved as follows. The MRs located at both ends of the MR array are spaced exactly one half of a tooth pitch apart, so that their signal output is 180° out of phase. Averaging their output, therefore, yields the dc bias. This provides a resolution of 1.25 mechanical degrees (2.5 electrical degrees with 2-pole pairs). The testing of the overall drive established that this resolution is sufficient for this application.

Figure 9:
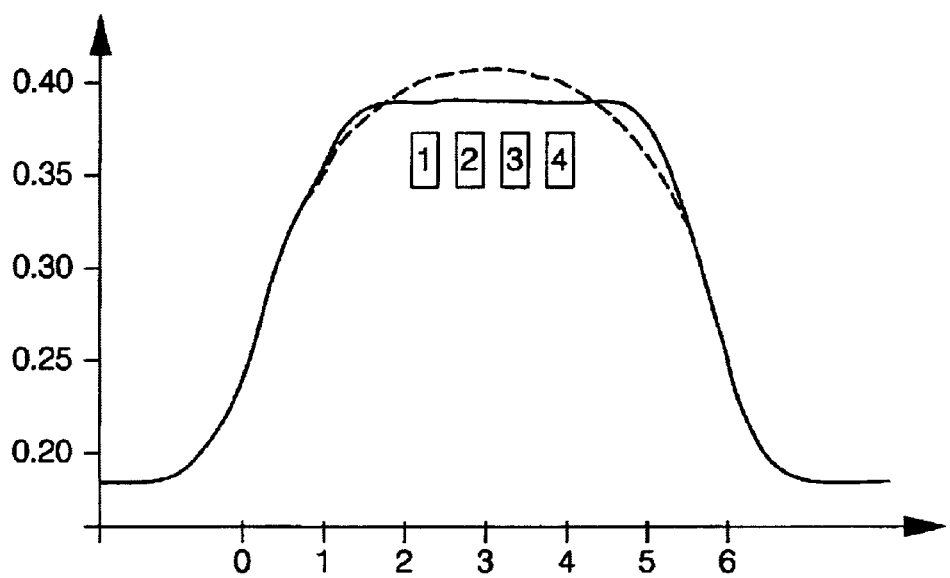
FIGS. 9A, 9B depicts an experiment showing the effect of a ferromagnetic layer.
Figure 9:
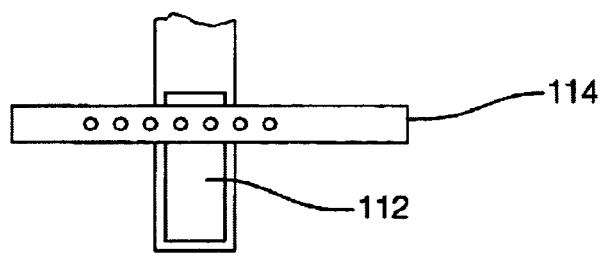

In order to ensure that the four MR's are biased by as uniform a field as possible, a 0.13 mm thick ferromagnetic layer is placed on the magnet surface below the MR array. The effect of a ferromagnetic layer is shown in FIGS. 9A, 9B. It plots the result of a test conducted on a stationary magnet 112 with and without a ferromagnetic layer. The magnetic flux density was measured across the magnet surface in the presence of a steel target 114 emulating the target wheel. A sketch, FIG. 9A, is illustrative of the experimental set up. Without a ferromagnetic layer, the flux density pattern is dome shaped as depicted by the broken lines of FIG. 9A. With a four-MR array where the MR's are 0.5 mm apart (such a four-MR array is also sketched on the Figure), there would be a 1% difference in magnetic bias between adjacent MR's. With a ferromagnetic layer, the magnetic bias is identical, as depicted by the solid lines, and this 1% variation is eliminated. The ferromagnetic layer may simply be the leadframe used to hold the MRs and connect them to the outside.

A gear reducer is required in the EPS system to magnify the torque produced by the electric motor to the level required to assist the vehicle steering effort. The higher the gear ratio, the smaller the motor size and cost. This is particularly desirable with the slotless configuration of the TRF concept, which inherently penalizes the permanent magnet weight and cost.

Figure 10:
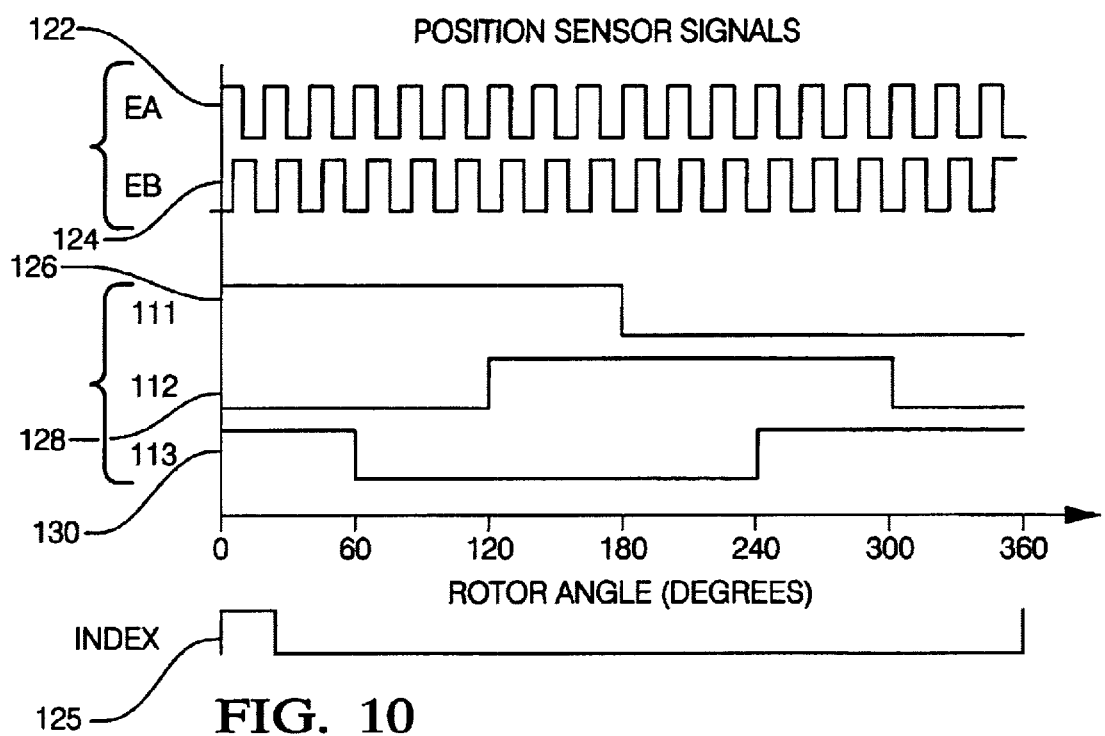
FIG. 10 shows a set of position sensor signals.

As can be appreciated in FIG. 10, a set of position sensor signals is depicted. Signals EA 122 and EB 124 are incremental position signals (EA 122 and EB 124 are in quadrature). Incremental sensors need some form of index pulse 125 to update and verify the pulse count. If an incremental sensor is used by itself, the index pulse 125 is provided by some means, such as a separate sensor and track, or by building the sensor in such a way that one of the index pulses looks different, once per revolution. In the case of the hybrid commutation/incremental sensors for brushless motors, the commutation signals H1 126, H2 128, and H3 130, or anyone of the three, can be used to provide the desired index pulse 125.

Figure 11:
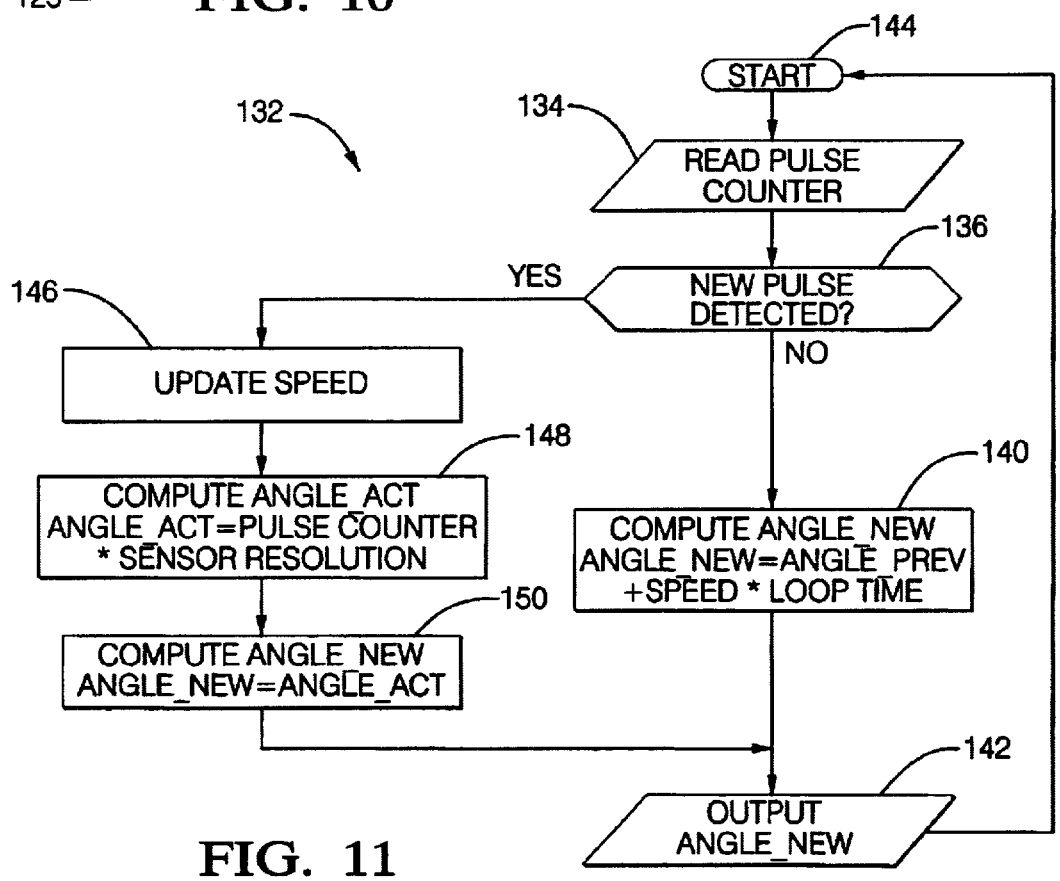
FIG. 11 depict a flowchart incorporating this disclosure.

Referring to FIG. 11, a flowchart 132 incorporating this disclosure. At box 134 the system reads a pulse counter from locations such as separate memory of a computer system or registers within a central processing unit (CPU). A determination of whether a new pulse is detected is determined at diamond 136. If a new pulse is not detected, the flowchart flows to box 140 wherein a new angle is computed. The computation of the new angle is by way of adding a previous store angle of the system with a product of a speed derived from the motor rotor 92 and that of a loop time. In other words, the equation $$\theta(k+1)=\theta(k)+\omega^*T \qquad (22)$$

is utilized to compute a new value of the angle where, k=time step,

θ=angle,

ω=angular speed,

T=control loop time.

As can be appreciated, this computed new value is merely an estimation. The computed, or estimated, new value of the angle flows to box 142 in which the new value is an output. This new value for the time being is the value of the new angle. The flow chart loops back to start 144 for another reading of the pulse counter.

If a new pulse is detected, then no estimation is required, the flowchart flows toward box 146 wherein a speed is updated. Upon update of the speed, an actual angle is computed at box 148. The actual angle is determined by way of multiplying a value of the pulse counter and a sensor resolution thereby obtaining a product. The value of the product is the value of the actual angle. Therefore, at box 150, the value of the new angle is defined as the value of the actual angle. In other words, the value of the actual angle is stored in a set location wherein current value of the new angle is supposed to be stored. The value of the current new angle, in turn, flows toward output box 142 and flows toward the start 144 of the flowchart for another round of processing.

It is noted that the rotor position encoder 14 needs a low-resolution sensor that is sufficient to generate or sample position signals significant enough for a sinusoidal motor control system. Therefore, a sensor included in the rotor position encoder 14 need not be the sensor described in FIG. 8. However, the sensor described in FIG. 8 may be used if it can generate or sample position signals significant enough for a sinusoidal motor control system. Thus, any suitable sensor capable of a sinusoidal wave for the sinusoidal motor control system will suffice for the purpose of this disclosure.

It can be appreciated that having a low resolution position sensor will shape a sinusoidal position signal similar to a stepladder, thereby introducing a magnitude error and a lag effect. Also introduced are higher harmonics as noise in the position signals and estimated speed signals.

This disclosure teaches a method and apparatus for measuring a rotary position of an electric machine that includes reading a pulse counter that counts a sequence of pulses. The sequence of pulses is related to the rotary position. A determination is then made as to whether a new pulse has been detected is performed and a computation of a new angle that is related to the rotary position is generated. A speed measuring circuit that includes an input having a set of position signals and an output having a set of speed signals may be included in the method for measuring a rotary position of an electric machine.

Note that this disclosure teaches signal smoothing while using a low-resolution sensor. This disclosure further teaches an estimation of a position during a time interval between sensor pulses and the usage of the next detected angle as a starting position for a next estimation loop. Thus, errors are significantly reduced using the teachings of this disclosure as opposed to no estimation. A relatively low-resolution sensor using the teachings of this disclosure can achieve results with less error.

Referring again to FIG. 11, two events occur upon the detection of a position sensor pulse. First, a speed estimation algorithm (not shown) is executed. Second, a new sensed position replaces the estimated value of the position angle. In other words, a newly sensed position information is recorded and utilized. In addition, it is pointed out that other methods for computing the position estimate exist. For example, a "Kalman" filter algorithm, least squares, and the like.

It is noted that, because the proposed algorithm is used to smooth the position signal without introducing any delay or noise, any combination of the above mentioned method and filtering schemes can be used. It can be appreciated that the filtering can take place in regard to position signals or in regard to a speed signal that is estimated. It is noted that the estimated speed signal is computed from the position signal. It is further noted that both the estimated speed signal and the position signal can be filtered in combination. However, one must be careful not to introduce too long a time lag that may deteriorate the machine command signal such as a voltage command in the case of voltage mode operation.

Figure 12:
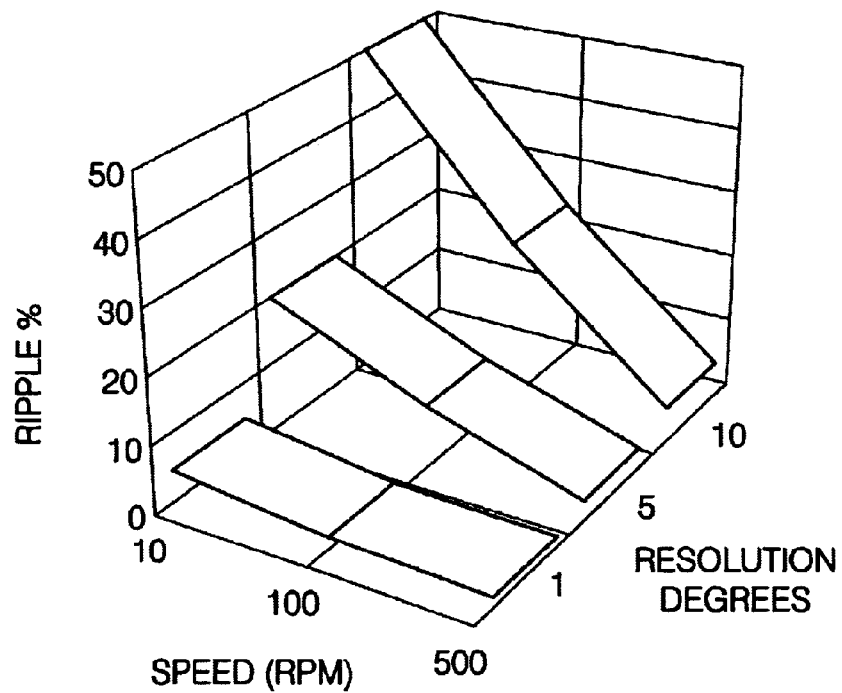
FIGS. 12A and 12B depict graphs of results of a simulation that demonstrates the effect of position sensor resolution on torque ripple via both the position and speed signals.
Figure 12:
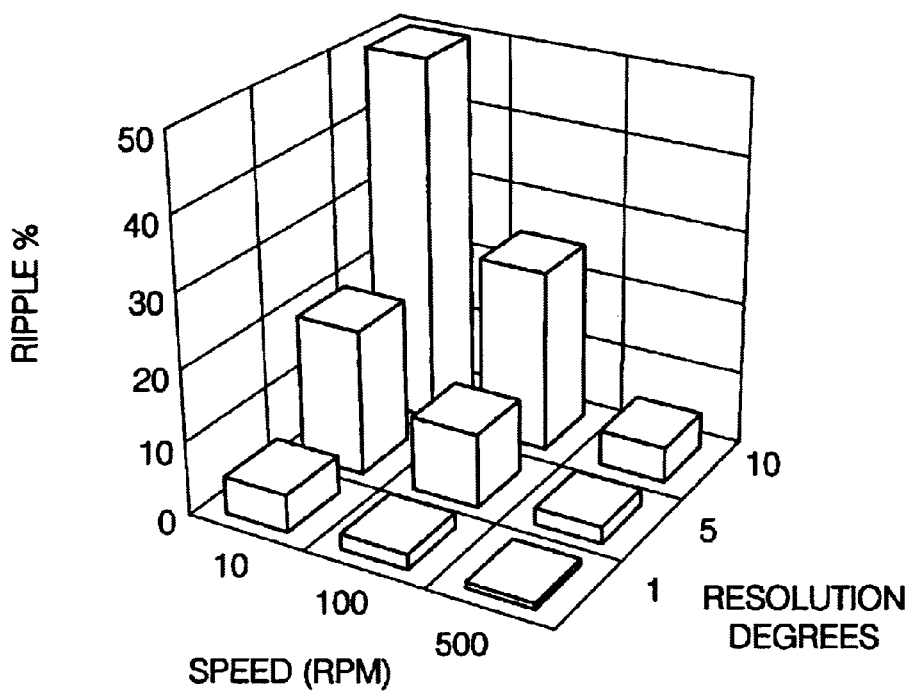

Referring to FIG. 12 simulation results of the effect of position sensor resolution on torque ripple via both the position and speed signals is graphed.

Figure 13:
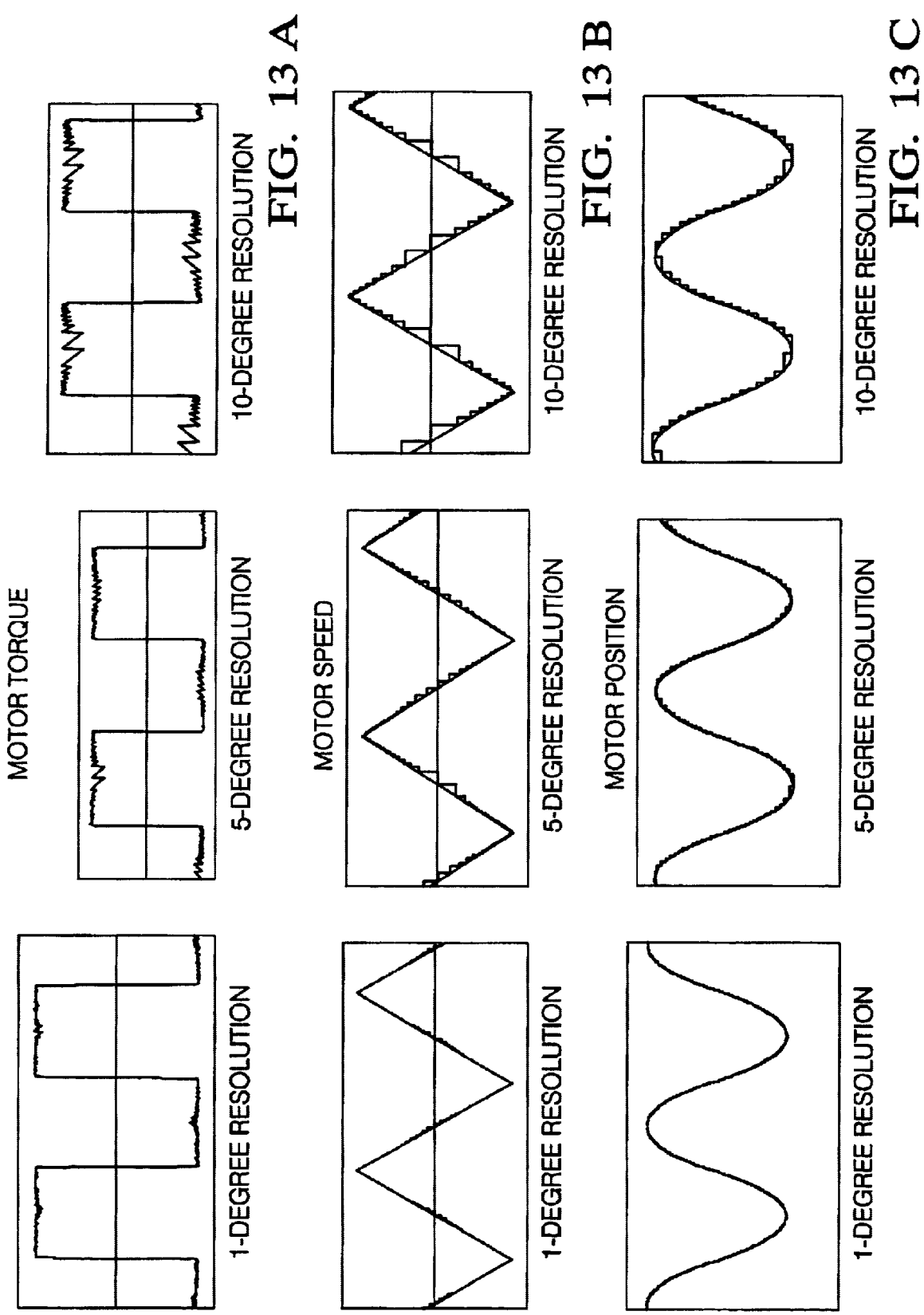
FIGS. 13A, 13B, and 13C show simulation results of torque speed and position versus time.

Referring to FIGS. 13A, 13B, and 13C, FIG. 13A graphs simulation results of torque in relation to time depicted by a set of simulation results of torques at one, five, and ten electrical degree(s) respectively. FIG. 13B graphs simulation results of speed in relation to time depicted by a set of simulation results of speeds at one, five, and ten electrical degree(s) respectively. FIG. 13C graphs simulation results of position in relation to time depicted by a set of simulation results of positions at one, five, and ten electrical degree(s) respectively. Please note the ladder or step effect that is predominantly portrayed at ten-degree resolutions. In other words, as the resolution gets lower as a result of coarser sensors, the resultant torque ripple increases in magnitude and decreased in frequency. It is evident that both magnitude and frequency of the torque ripple are important. As a percentage of torque, the magnitude affects the load capability of the drive mechanism. The frequency is crucial to structurally borne vibrations and noise.

Figure 14:
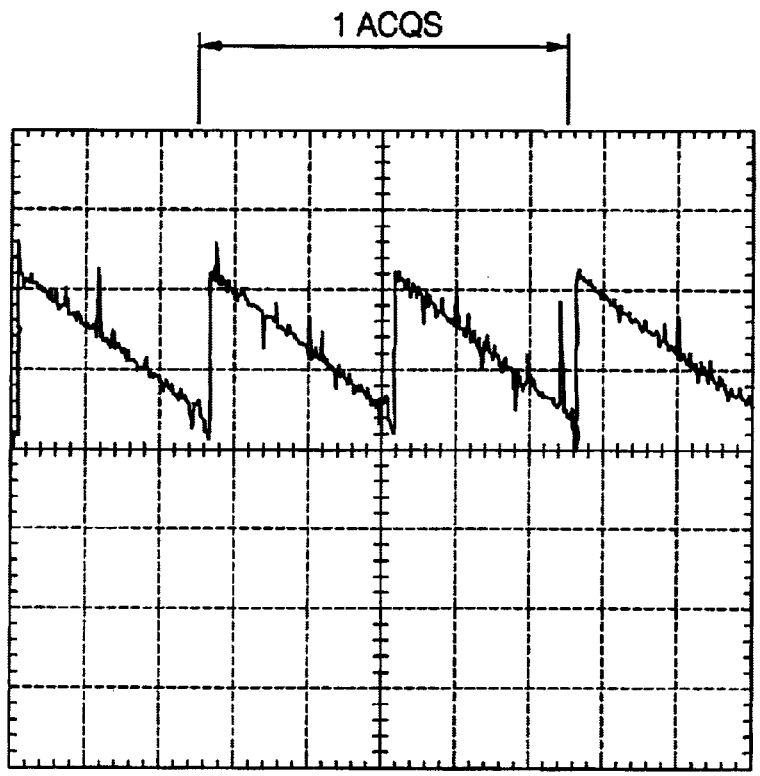
FIGS. 14a, 14b, and 14c depict a set of relationships between measured position angels versus time for a digital-to-analog (D/A) output.
Figure 14:
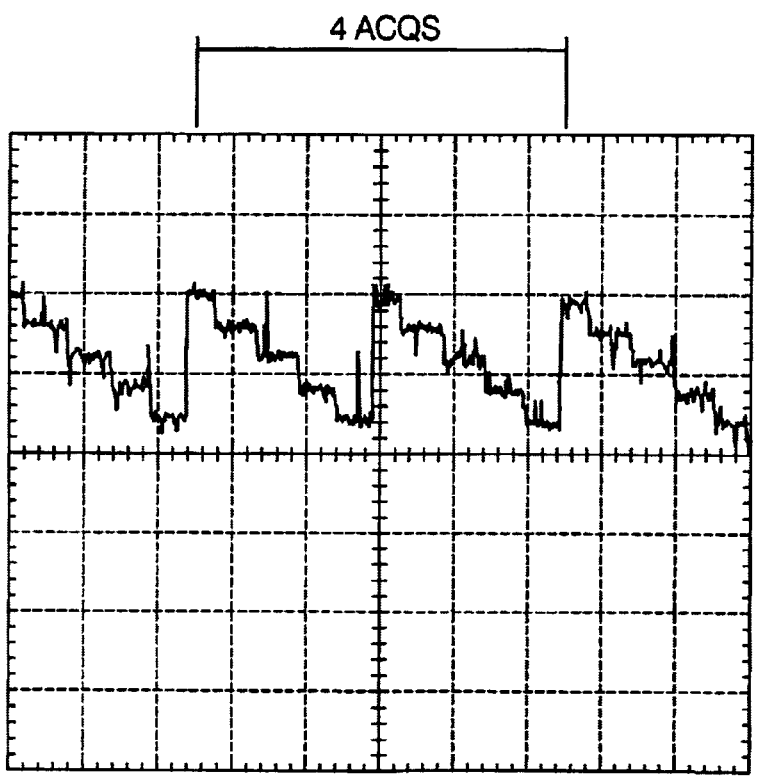
Figure 14:
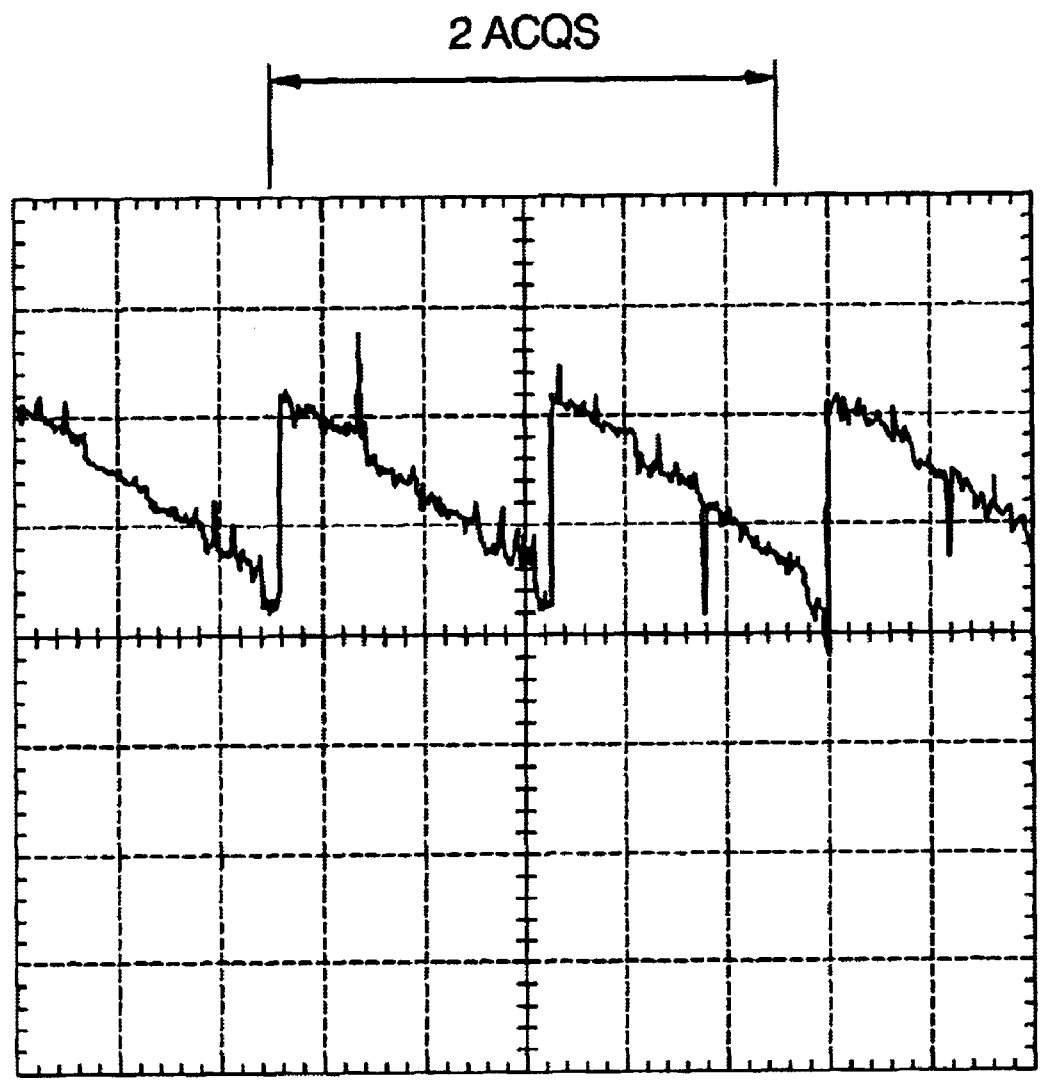

Referring now to FIGS. 14A, 14B, and 14C graphically depict a set of relationships between measured position angels versus time for a digital-to-analog (D/A) output. The digital-to-analog (D/A) output is the output of a torque-ripple-free electric power steering motor running at an average speed of 10 rpm. FIG. 14A graphs positions with one electrical degree resolution sensor (high resolution). FIG. 14B graphs positions with 80 electrical degree resolution sensor with no angle estimation between pulses (low resolution). FIG. 14C graphs positions with 80 electrical degree resolution sensor with angle estimation between pulses (low resolution). Attention is called to the fact that signal spikes occur in both high resolution and low resolutions results. Thus, it necessarily follows that these spikes are indications of some measurement noise such as noise in the D/A circuit and is independent of the angle estimation between pulses as this disclosure teaches.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What claimed is:

1. A method for measuring a rotary position of an electric machine comprising:

reading a pulse counter counting a sequence of pulses relating to said rotary position;

determining whether a new pulse has been detected; and computing a new angle relating to said rotary position.

2. The method of claim 1 wherein said computing said new angle relating to said rotary position when a pulse is detected comprises:

multiplying said reading from said pulse counter by a set sensor resolution thus deriving a product from said multiplying.

3. The method of claim 2 further comprising:

storing said product from said multiplying as said new angle.

4. The method of claim 2 further comprising: updating a new speed value.

5. The method of claim 1 wherein said computing said new angle relating to said rotary position when no pulse is detected comprises:

adding a previous angle value to a product of a rotary speed and a loop time thereby arriving at a sum; and storing said sum as said new angle.

6. The method of claim 1 further comprising:

outputting a value of said new angle relating to said rotary position via an outputting device.

7. A storage medium encoded with machine-readable computer program code for generating a pulse, said storage medium including instructions for measuring a rotary position of an electric machine causing a computer to implement a method comprising:

reading a pulse counter counting a sequence of pulses relating to said rotary position;

and computing a new angle relating to said rotary position in response to whether or not a pulse has been detected.

8. The storage medium of claim 7 further comprising instructions for causing a computer to implement:

multiplying said reading from said pulse counter by a set sensor resolution thus arriving a product from said multiplying.

9. The storage medium of claim 8 further comprising instructions for causing a computer to implement:

storing said product from said multiplying as said new angle.

10. The storage medium of claim 8 further comprising instructions for causing a computer to implement:

updating a new speed value.

11. The storage medium of claim 7 wherein said computing said new angle relating to said rotary position when no pulse is detected comprising:

adding a previous angle value by a product of a rotary speed and a loop time thereby arriving at a sum; and storing said sum as said new angle.

12. The storage medium of claim 7 further comprising instructions for causing a computer to implement:

outputting a value of said new angle relating to said rotary position via an outputting device.

13. A speed measuring circuit comprising:

an output having a set of position signals;

an output having a set of speed signals; and a device, communicated with said input and said output wherein said device performs a method for measuring a rotary position of an electric machine, wherein said method comprises:

reading a pulse counter counting a sequence of pulses relating to said rotary position;

determining whether a new pulse has been detected; and computing a new angle relating to said rotary position.

14. The speed measuring circuit of claim 13 wherein computing said new angle relating to said rotary position when a pulse is detected comprises:

multiplying said reading from said pulse counter by a set sensor resolution thus arriving a product from said multiplying.

15. The speed measuring circuit of claim 14 wherein computing said new angle relating to said rotary position when said pulse is detected further comprising:

storing said product from said multiplying as said new angle.

16. The speed measuring circuit of claim 13 wherein computing said new angle relating to said rotary position when said pulse is detected further comprises:

updating a new speed value.

17. The speed measuring circuit of claim 13 wherein computing said new angle relating to said rotary position when no pulse is detected comprises:

adding a previous angle value to a product of a rotary speed and a loop time thereby arriving at a sum; and storing said sum as said new angle.

18. The speed measuring circuit of claim 13 further comprises:

outputting a value of said new angle relating to said rotary position via an outputting device.

19. The speed measuring circuit of claim 13 wherein computing said new angle relating to said rotary position when no pulse is detected comprises:

adding a previous angle value to a filtered speed term, thereby arriving at a sum; and storing said sum as said new angle.

* * * * *